United States Patent
Homer et al.

(10) Patent No.: US 7,782,599 B2
(45) Date of Patent: Aug. 24, 2010

(54) COMPUTER DEVICE WITH STIFFENED DISPLAY MEMBER

(75) Inventors: Steven S. Homer, Tomball, TX (US); Ronald E. Deluga, Spring, TX (US); Mark H. Ruch, The Woodlands, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 443 days.

(21) Appl. No.: 11/209,152

(22) Filed: Aug. 22, 2005

(65) Prior Publication Data

US 2007/0041149 A1 Feb. 22, 2007

(51) Int. Cl.
*H05K 5/00* (2006.01)
*H05K 7/00* (2006.01)

(52) U.S. Cl. ............................ 361/679.21; 361/679.22; 361/679.26

(58) Field of Classification Search ................. 361/681, 361/679.04–679.07, 649.21–679.3, 679.55, 361/679.56
See application file for complete search history.

(56) References Cited

U.S. PATENT DOCUMENTS

| | | | | | |
|---|---|---|---|---|---|
| D358,171 | S | * | 5/1995 | Cheng | D19/60 |
| 5,697,718 | A | * | 12/1997 | Erler et al. | 400/714 |
| 5,706,168 | A | * | 1/1998 | Erler et al. | 361/685 |
| 5,835,342 | A | * | 11/1998 | Hunte | 361/681 |
| 6,134,103 | A | * | 10/2000 | Ghanma | 361/681 |
| 6,189,850 | B1 | * | 2/2001 | Liao et al. | 248/292.14 |
| 6,288,891 | B1 | * | 9/2001 | Hasegawa et al. | 361/681 |
| 6,543,734 | B2 | * | 4/2003 | Yeh | 248/291.1 |
| 6,680,843 | B2 | * | 1/2004 | Farrow et al. | 361/681 |
| D520,018 | S | * | 5/2006 | Kase et al. | D14/452 |
| D541,270 | S | * | 4/2007 | Sassano et al. | D14/315 |
| 7,245,481 | B2 | * | 7/2007 | Shimizu et al. | 361/681 |
| 2002/0011544 | A1 | * | 1/2002 | Bosson | 248/121 |

* cited by examiner

*Primary Examiner*—Jayprakash N Gandhi
*Assistant Examiner*—Anthony M Haughton

(57) ABSTRACT

A computer device comprising a display member rotatably coupled to a base member. The display member comprises a vaulted member disposed on a side of the display member opposite a viewing side of a display screen of the display member to stiffen the display member.

19 Claims, 3 Drawing Sheets

COMPUTER DEVICE WITH STIFFENED DISPLAY MEMBER

BACKGROUND OF THE INVENTION

Computer devices such as notebook and laptop computers comprise fragile components disposed within the computer device display member (e.g., a display screen such as a liquid crystal display (LCD)). During use, transport, and/or storage of the computer device, the components in the display member can be subject to forces that cause damage and/or substantially reduce the life of the components. For example, an LCD may be subject to harmful torsional forces (e.g., twisting) when opening and/or closing the computer's display member. Similarly, the LCD may be subject to damaging compressive forces, especially while inside a computer carrying case during transport and/or storage. Further, damage to display member components has become increasingly problematic as a result of manufacturers' continuing efforts to make computer devices, including display members and display screens, thinner and lighter.

BRIEF DESCRIPTION OF THE DRAWINGS

For a more complete understanding of the present invention, and the objects and advantages thereof, reference is now made to the following descriptions taken in connection with the accompanying drawings in which.

DETAILED DESCRIPTION OF THE DRAWINGS

The preferred embodiments of the present invention and the advantages thereof are best understood by referring to FIGS. 1-4 of the drawings, like numerals being used for like and corresponding parts of the various drawings.

Figure 1A:
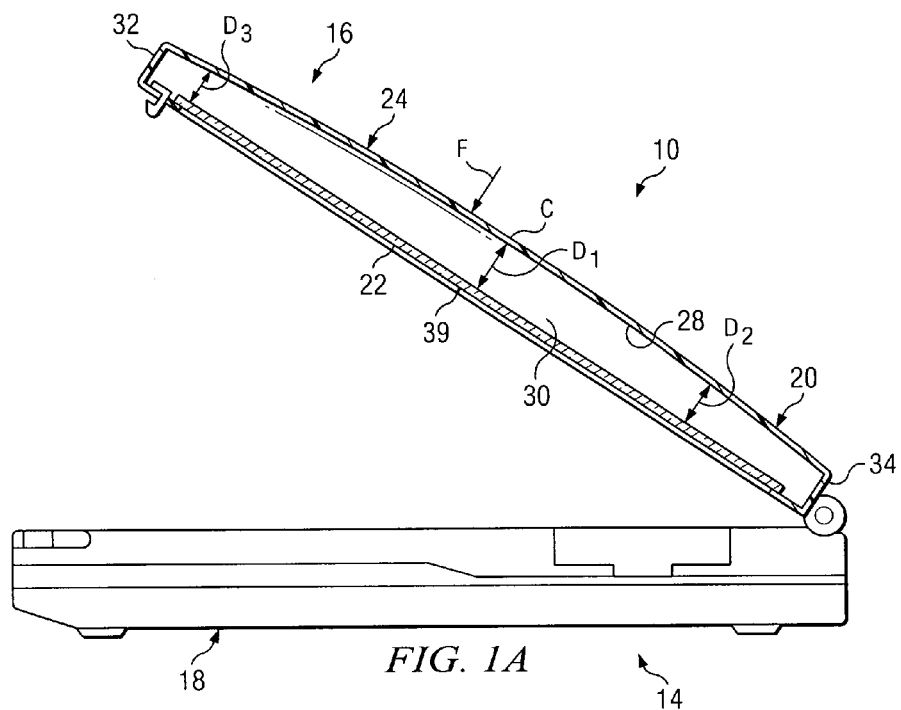
FIG. 1A is a side view of an embodiment of a computer device in accordance with the present invention comprising a stiffened display member in a partially open position with portions broken away.
Figure 1B:
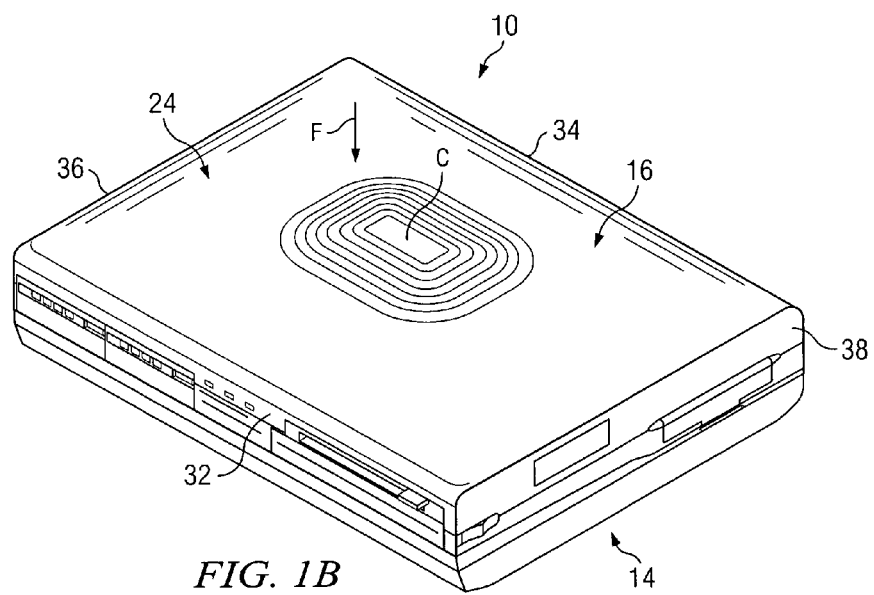
FIG. 1B is a front perspective view of the embodiment of the computer device illustrated in FIG. 1A.

FIGS. 1A and 1B are diagrams illustrating an embodiment of a computer device 10 comprising a stiffened display member 16 in accordance with an embodiment of the present invention. In the embodiment illustrated in FIGS. 1A and 1B, computer device 10 comprises a laptop or notebook computer 14. However, it should be understood that computer device 10 may comprise other types of devices, such as, but not by way of limitation, a tablet personal computer.

In the embodiment illustrated in FIGS. 1A and 1B, computer device 10 comprises stiffened display member 16 rotatably coupled to a base member 18. Stiffened display member 16 comprises a housing 20 having a front wall 32, a rear wall 34, and sidewalls 36 and 38 to support a display screen 22, such as a liquid crystal display (LCD). Stiffened display member 16 comprises a vaulted support member 24 gradually extending from housing sidewalls 32, 34, 36 and 38 and disposed on a side of display member 16 opposite a viewing side 39 of display screen 22.

In the embodiment illustrated in FIGS. 1A and 1B, vaulted support member 24 is manufactured to be provided with a bottom surface 28 variably spaced apart from a rearward side of display screen 22 to form a variable gap 30 therebetween, the dimension of gap 30 configured to change linearly and/or non-linearly, or transition therebetween, as desired across a length, width, or other dimension of support member 24 relative to display screen 22. In the embodiment illustrated in FIGS. 1A and 1B, variable gap 30 is illustrated as extending between sidewalls 32 and 34 and sidewalls 36 and 38 and having a non-linearly changing dimension across such directions. Accordingly, bottom surface 28 is spaced apart from display screen 22 a predetermined distance or dimension D (which may vary over a dimension of display member 16). In the embodiment illustrated in FIGS. 1A and 1B, the maximum dimension $D_1$ of gap 30 is disposed at a central location C of display member 16, and dimensions $D_2$ and $D_3$ of gap 30 are different from each other and less than the maximum dimension $D_1$ of gap 30 (e.g., dimension $D_3$ illustrated as being less than dimension D2). However, it should be understood that the maximum distance $D_1$ of gap 30 may be otherwise located. Further, in the embodiment illustrated ion FIG. 1A, gap 30 is illustrated as being devoid of any components; however, it should be understood that various components of device 10 may extend into and/or through gap 30.

In operation, when a compressive force F is exerted on vaulted support member 24, recessed area 30 provides adequate clearance between bottom surface 28 and display screen 22 to prevent contact between bottom surface 28 and display screen 22. Furthermore, the vaulted configuration of vaulted support member 24 acts to stiffen support member 24 in order to substantially reduce or eliminate the likelihood of support member 24 deflecting, bending, twisting or otherwise deforming during transport, storage and/or when moving display member 16 relative to base member 18 (e.g., resisting torsional forces exerted on display member 16 by a user when opening/closing display member 16 or moving device 10).

In the embodiment illustrated in FIGS. 1A and 1B, vaulted support member 24 comprises a curved and/or non-linearly formed surface; however, it should be understood that support member 24 may be otherwise configured. It should be further understood that vaulted support member 24 can be manufactured with a steeper or shallower slope/curve than that illustrated in FIGS. 1A and 1B. In the embodiment illustrated in FIGS. 1A and 1B, the amount of slope/curve is slightly accentuated for purposes of illustration.

Figure 2:
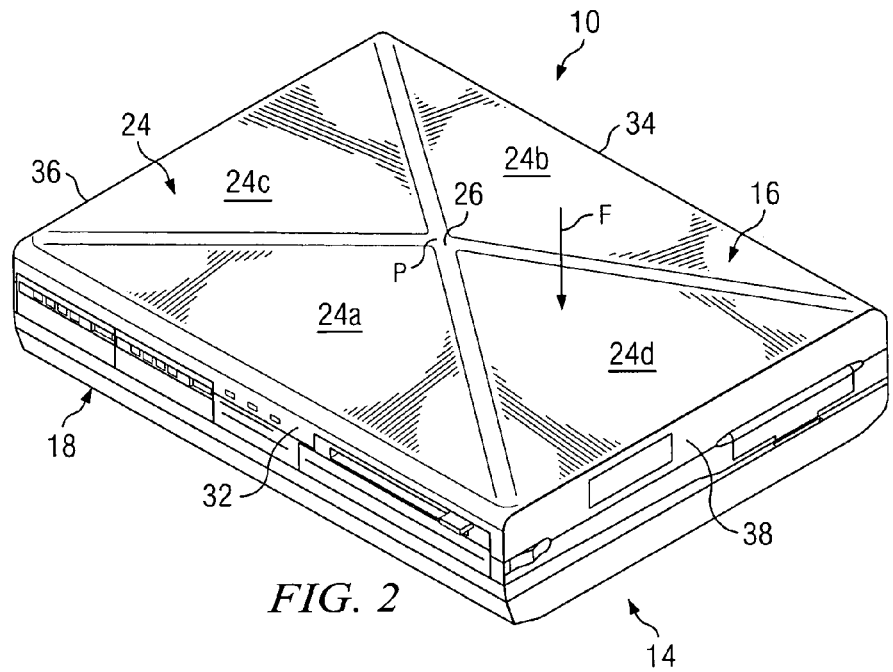
FIG. 2 is a front perspective view of another embodiment of a computer device comprising a stiffened display member in accordance with the present invention.

FIG. 2 is a front perspective view of another embodiment of computer device 10 in accordance with the present invention. In the embodiment illustrated in FIG. 2, stiffened display member 16 comprises vaulted support member 24 having a plurality of sloped portions 24a, 24b, 24c and 24d gradually extending linearly from respective front wall 32, rear wall 34 and sidewalls 36 and 38 to form an apex 26 in a position centrally disposed on vaulted support member 24. While apex 26 is illustrated culminating to a centrally disposed point P, it should be understood that apex 26 can also culminate to form a planar surface for aesthetic reasons or uses such as, but not limited to, disposing a logo or other identifying information (e.g., as illustrated near location C in FIG. 1B). Further, in the embodiment illustrated in FIG. 2, gap 30 (FIG. 1A) is configured having a linearly changing dimension across display member 16 based on the linear configurations of portions 24a, 24b, 24c and 24d.

Figure 3:
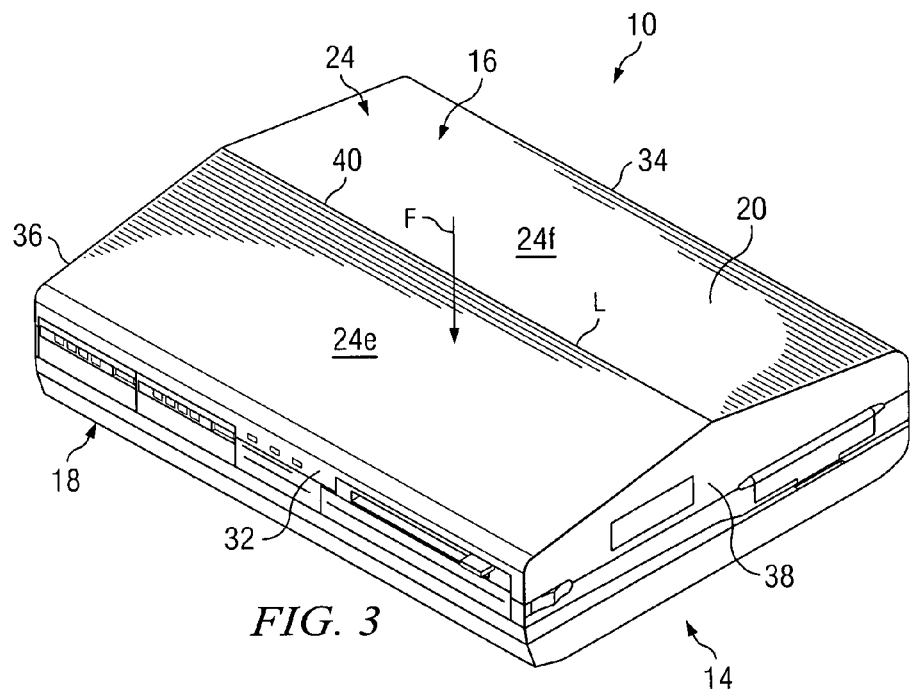
FIG. 3 is a front perspective view of another embodiment of a computer device having a stiffening display member in accordance with the present invention.

FIG. 3 is a front perspective view of another embodiment of a computer device 10 having stiffened display member 16 in accordance with the present invention. In the embodiment illustrated in FIG. 3, stiffened display member 16 comprises vaulted support member 24 having linearly sloped walls/portions 24e and 24f gradually extending from front and rear walls 32 and 34, respectively, to form an apex 40. In the embodiment illustrated in FIG. 3, apex 40 extends between sidewalls 36 and 38 forming a line segment L; however, it should be understood that apex 40 can be alternatively arranged in any number of configurations, including, but not limited to, extending a partial length between sidewalls 36 and 38, extending or partially extending between front and rear walls 32 and 34, or extending or partially extending diagonally across support member 24. Furthermore, while apex 40 is illustrated as a line segment L in FIG. 3, it should be understood that support member 24 can also culminate to form an apex 40 comprising a planar surface for aesthetic reasons or uses such as, but not limited to, disposing a logo or other identifying information thereon (e.g., as illustrated near location C in FIG. 1B). Further, in the embodiment illustrated in FIG. 3, gap 30 (FIG. 1A) is configured having a linearly changing dimension across display member 16 based on the linear configurations of portions 24e and 24f.

Figure 4:
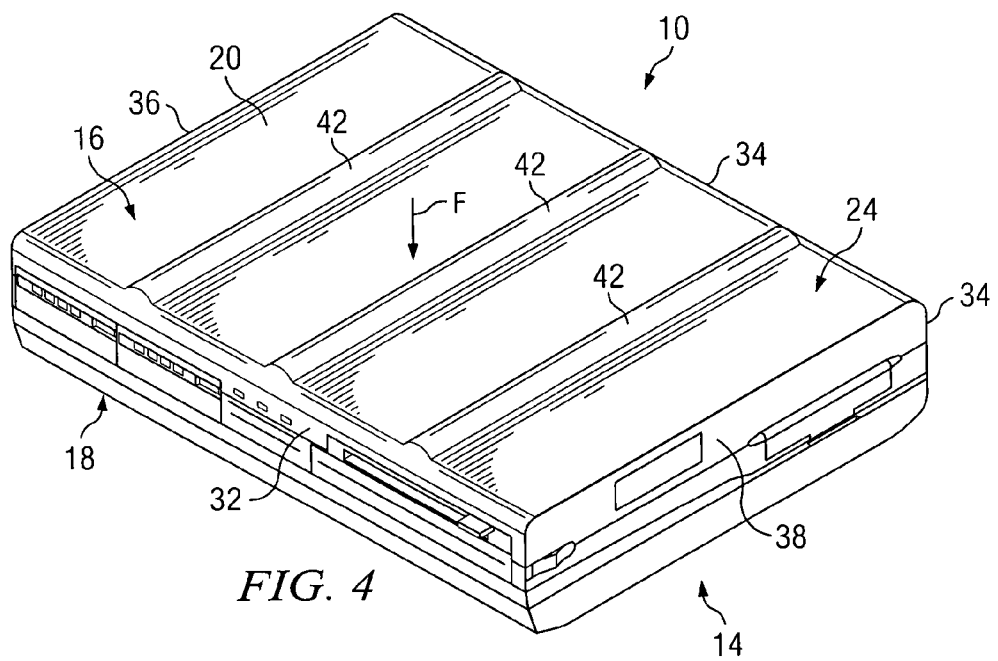
FIG. 4 is a front perspective view of yet another embodiment of a computer device having a stiffened display member in accordance with the present invention.

FIG. 4 is a front perspective view of another embodiment of a computer device 10 having stiffened display member 16 in accordance with the present invention. In the embodiment illustrated in FIG. 4, stiffened display member 16 comprises vaulted support member 24 comprising a plurality of vaulted portions 42. In the embodiment illustrated in FIG. 4, vaulted portions 42 are parallel and spaced apart from each other and are adapted to extend, at least partially, between front and rear walls 32 and 34 to resist compressive and/or torsional forces that may act on vaulted support member 24 during use, transport, and/or storage of computer device 10. It should be understood that a greater or fewer number of vaulted portions 42 can be formed and can be oriented in any direction, such as extending or partially extending between sidewalls 36 and 38 and/or extending or partially extending diagonally along support member 24 or any combination thereof. In addition, vaulted portions 42 are also adapted to extend in any number of patterns on vaulted support member 24, such as for example, curved segments, semi-circular segments, circular segments, etc., and can be linearly and/or non-linearly formed. In the embodiment illustrated in FIG. 4, gap 30 (FIG. 1A) is configured to have multiple apexes corresponding to each vaulted portion 42, thereby resulting in gap 30 (FIG. 1A) having a maximum and/or increased dimension at multiple locations. Further, in the embodiment illustrated in FIG. 4, gap 30 (FIG. 1A) changes non-linearly across a distance measured from wall 36 to wall 38 while remaining generally constant across a distance measured from wall 32 to wall 34. Moreover, it should be understood that gap 30 (FIG. 1A) and a corresponding maximum dimension(s) thereof may be located at multiple locations on display member 16 none of which correspond to a central location of display member 16. Additionally, it should be understood that vaulted member 24 may be configured having a variety of geometric shapes (e.g., teardrop-shaped, parabola-shaped, etc.), such that a maximum dimension of gap 30 (FIG. 1A) extends over a desired distance (e.g., as opposed to a maximum dimension of gap 30 (FIG. 1A) located at a single point).

Thus, embodiments of the present invention provide a stiffened display member 16 to resist torsional and compressive forces exerted on display member 16 of a computer device 10 in order to protect display screen 22 and other components disposed within display member 16.

What is claimed is:

1. A computer device comprising:
a display member having a first sidewall oppositely disposed from a second sidewall and a front sidewall oppositely disposed from a rear sidewall and being rotatably coupled to a base member, the display member comprising a vaulted member disposed on a side of the display member opposite a viewing side of a display screen of the display member to stiffen the display member, wherein the vaulted member comprises a centrally located apex that extends from the first sidewall to the second sidewall to form a line segment between the first and second sidewalls and is centrally located between the front and rear sidewalls.

2. The computer device of claim 1, further comprising a variable gap disposed between the vaulted member and the display screen.

3. The computer device of claim 1, wherein the vaulted member is non-linearly configured.

4. The computer device of claim 1, wherein the vaulted member comprises a plurality of sloped portions.

5. The computer device of claim 1, wherein the vaulted member comprises a plurality of linearly sloped portions.

6. The computer device of claim 1, wherein the vaulted member comprises at least one apex extending at least partially across the vaulted member.

7. The computer device of claim 1, wherein the vaulted member comprises a plurality of vaulted portions.

8. A method of manufacturing a computer device, comprising:
rotatably coupling a display member having a display screen to a base member, the display member having a first sidewall oppositely disposed from a second sidewall and a front sidewall oppositely disposed from a rear sidewall;
providing a vaulted member on a side of the display member opposite a viewing side of the display screen to stiffen the display member, and
providing a centrally located apex on the vaulted member, wherein the apex extends from the front sidewall to the rear sidewall to form a line segment between the front and rear sidewalls and is centrally located between the first and second sidewalls.

9. The method of claim 8, further comprising providing a variable gap disposed between the vaulted member and the display screen.

10. The method of claim 8, further comprising providing the vaulted member having a non-linear configuration.

11. The method of claim 8, further comprising providing a plurality of sloped portions on the vaulted member.

12. The method of claim 8, further comprising providing a plurality of linearly sloped portions on the vaulted member.

13. The method of claim 8, further comprising providing at least one apex extending at least partially across the vaulted member.

14. The method of claim 8, further comprising providing the vaulted member having a plurality of vaulted portions.

15. A notebook computer comprising:
a base; and
a display rotatable coupled to the base and including a display screen on a first side, a vaulted member disposed on a second side opposite the first side, a first sidewall oppositely disposed from a second sidewall, and a front sidewall oppositely disposed from a rear sidewall, wherein the vaulted member forms an apex that extends from the first sidewall to the second sidewall to form a line segment between the first and second sidewalls and is centrally located between the front sidewall and the rear sidewall.

16. A computer device comprising:

a display member rotatably coupled to a base member and including a display screen, a vaulted member on a side opposite the display screen, a first sidewall oppositely disposed from a second sidewall, and a front sidewall oppositely disposed from a rear sidewall, wherein the vaulted member has an apex that extends between front and rear sidewalls to form a line segment between the front and rear sidewalls and is centrally located between the first and second sidewalls.

17. The computer device of claim 16, wherein the display member is configured to form a non-linear variable gap.

18. A notebook computer comprising:

a base; and a display member coupled to the base and including a display screen, a vaulted member on a side opposite the display screen, a first sidewall oppositely disposed from a second sidewall, and a front sidewall oppositely disposed from a rear sidewall, wherein the vaulted member has four sloped portions with a first sloped portion extending from the first sidewall, a second sloped portion extending from the second sidewall, a third sloped portion extending from the front sidewall, and a fourth sloped portion extending from the rear sidewall.

19. The notebook computer of claim 18, wherein the vaulted member culminates to a point that is located centrally between the first and second sidewalls and centrally between the front and rear sidewalls.

* * * * *

UNITED STATES PATENT AND TRADEMARK OFFICE
CERTIFICATE OF CORRECTION

PATENT NO. : 7,782,599 B2  
APPLICATION NO. : 11/209152  
DATED : August 24, 2010  
INVENTOR(S) : Steven S. Homer et al.

Page 1 of 1

It is certified that error appears in the above-identified patent and that said Letters Patent is hereby corrected as shown below:

In column 4, line 63, in Claim 15, delete "rotatable" and insert -- rotatably --, therefor.

Signed and Sealed this
Eighth Day of March, 2011

David J. Kappos
*Director of the United States Patent and Trademark Office*